United States Patent
Ito et al.

(10) Patent No.: US 11,603,738 B2
(45) Date of Patent: Mar. 14, 2023

(54) ESTIMATION SYSTEM, ESTIMATION DEVICE, AND ESTIMATION METHOD

(71) Applicant: Yokogawa Electric Corporation, Musashino (JP)

(72) Inventors: Shumpei Ito, Musashino (JP); Yoshiaki Tanaka, Musashino (JP); Tatsuya Hazuku, Tokyo (JP); Tomonori Ihara, Tokyo (JP); Motoaki Morita, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 129 days.

(21) Appl. No.: 17/216,876

(22) Filed: Mar. 30, 2021

(65) Prior Publication Data

US 2021/0301625 A1    Sep. 30, 2021

(30) Foreign Application Priority Data

Mar. 31, 2020    (JP) .............................. JP2020-063026

(51) Int. Cl.
  *E21B 28/00*    (2006.01)
  *E21B 37/00*    (2006.01)
  *E21B 7/24*    (2006.01)

(52) U.S. Cl.
  CPC ................ *E21B 37/00* (2013.01); *E21B 7/24* (2013.01); *E21B 28/00* (2013.01)

(58) Field of Classification Search
  CPC ............ E21B 28/00; E21B 37/00; E21B 7/24; G01N 17/008; G01N 25/18
  See application file for complete search history.

(56) References Cited

U.S. PATENT DOCUMENTS

| | | | |
|---|---|---|---|
| 5,248,198 A | 9/1993 | Droege | |
| 6,644,848 B1 | 11/2003 | Clayton et al. | |
| 6,886,393 B1 * | 5/2005 | Romanet .................. | F17D 3/01 73/61.62 |
| 8,960,305 B2 | 2/2015 | McCann et al. | |
| 2004/0059505 A1 | 3/2004 | Gallagher | |
| 2008/0298426 A1 * | 12/2008 | Koschack ............... | F23M 5/08 374/7 |
| 2011/0308548 A1 | 12/2011 | Amundsen et al. | |
| 2021/0108917 A1 * | 4/2021 | Hazuku ................. | G01B 21/085 |
| 2021/0301625 A1 * | 9/2021 | Ito .......................... | G01N 25/18 |

FOREIGN PATENT DOCUMENTS

| | | | | |
|---|---|---|---|---|
| EA | 018505 B1 * | 8/2013 | ............. | E21B 28/00 |
| EP | 3907489 A1 * | 11/2021 | ............. | E21B 28/00 |
| JP | 8-15189 A | 1/1996 | | |
| JP | 2016-166781 A | 9/2016 | | |

* cited by examiner

*Primary Examiner* — Daniel P Stephenson
(74) *Attorney, Agent, or Firm* — Sughrue Mion, PLLC

(57) ABSTRACT

An estimation system includes an acquirer, an inferrer, a corrector, and an estimator. The acquirer acquires a measured value of an outer surface temperature of a pipe through which fluid flows. The inferrer infers an execution time for a removal process for deposits on an inner surface of the pipe. The corrector corrects an estimated value used for estimating a thickness of the deposits, by using the measured value of the outer surface temperature of the pipe, which is acquired within a predetermined time from an inference result of the execution time for the removal process for the deposits. The estimator estimates the thickness of the deposits based on the corrected estimated value and the measured value of the outer surface temperature of the pipe.

20 Claims, 6 Drawing Sheets

ESTIMATION SYSTEM, ESTIMATION DEVICE, AND ESTIMATION METHOD

BACKGROUND

Technical Fields

The present invention relates to an estimation system, an estimation device, and an estimation method.

Priority is claimed on Japanese Patent Application No. 2020-063026, filed on Mar. 31, 2020, the contents of which are incorporated herein by reference.

Description of Related Art

In the related art, deposits of substances contained in fluid adhering to an inner surface (fluid path wall) of a pipe through which the fluid flows is known. For example, in oil and gas pipelines, it is known that deposits, such as hydrates, waxes, asphaltene, or scale, may adhere depending on the temperature and pressure conditions. Such deposits are, for example, removed from the inner surface of the pipeline by allowing an instrument called a pig to pass through the inside of the pipeline or introducing an inhibitor for inhibiting the formation of deposits into the pipeline. In the related art, when the thickness of the deposits adhering to the inner surface of a pipe is estimated and exceeds a threshold value, the aforementioned removal process may be performed. U.S. Pat. Nos. 6,644,848, 8,960,305, Japanese Unexamined Patent Application Publication No. 2016-166781, and US Patent Application Publication No. 2004/0059505 disclose methods of estimating the thickness of deposits adhering to the inner surface of a pipe, respectively.

However, in order to estimate the thickness of deposits adhering to the inner surface of the pipe, physical quantities, such as the outer surface temperature of a pipe, the temperature of fluid flowing through the pipe, a heat transfer coefficient for between the outside and the inside of the pipe, and a thermal conductivity of the deposits, may be required. Some of these physical quantities are measurable in the field such as for a pipeline and some are not measurable. Therefore, in order to estimate the thickness of deposits, estimated values may be used instead of physical quantities that are not measurable. However, when the deviation between an estimated value and a true value is large, there is a problem that it may not be possible to keep an estimation error for the thickness of deposits on the inner surface of a pipe within a predetermined range.

Furthermore, particularly, in the case of pipes installed under the natural environment, such as pipelines, there is a problem that changes in the surrounding environment (such as pipes being buried) may easily occur and the deviation between estimated values and true values is likely to be large.

SUMMARY

An estimation system may include: an acquirer configured to acquire a measured value of an outer surface temperature of a pipe through which fluid flows; an inferrer configured to infer an execution time for a removal process for deposits on an inner surface of the pipe; a corrector configured to correct an estimated value used for estimating a thickness of the deposits, by using the measured value of the outer surface temperature of the pipe, which is acquired within a predetermined time from an inference result of the execution time for the removal process for the deposits; and an estimator configured to estimate the thickness of the deposits based on the corrected estimated value and the measured value of the outer surface temperature of the pipe.

Further features and aspects of the present disclosure will become apparent from the following detailed description of exemplary embodiments with reference to the attached drawings.

DESCRIPTION OF EMBODIMENTS

Figure 1:
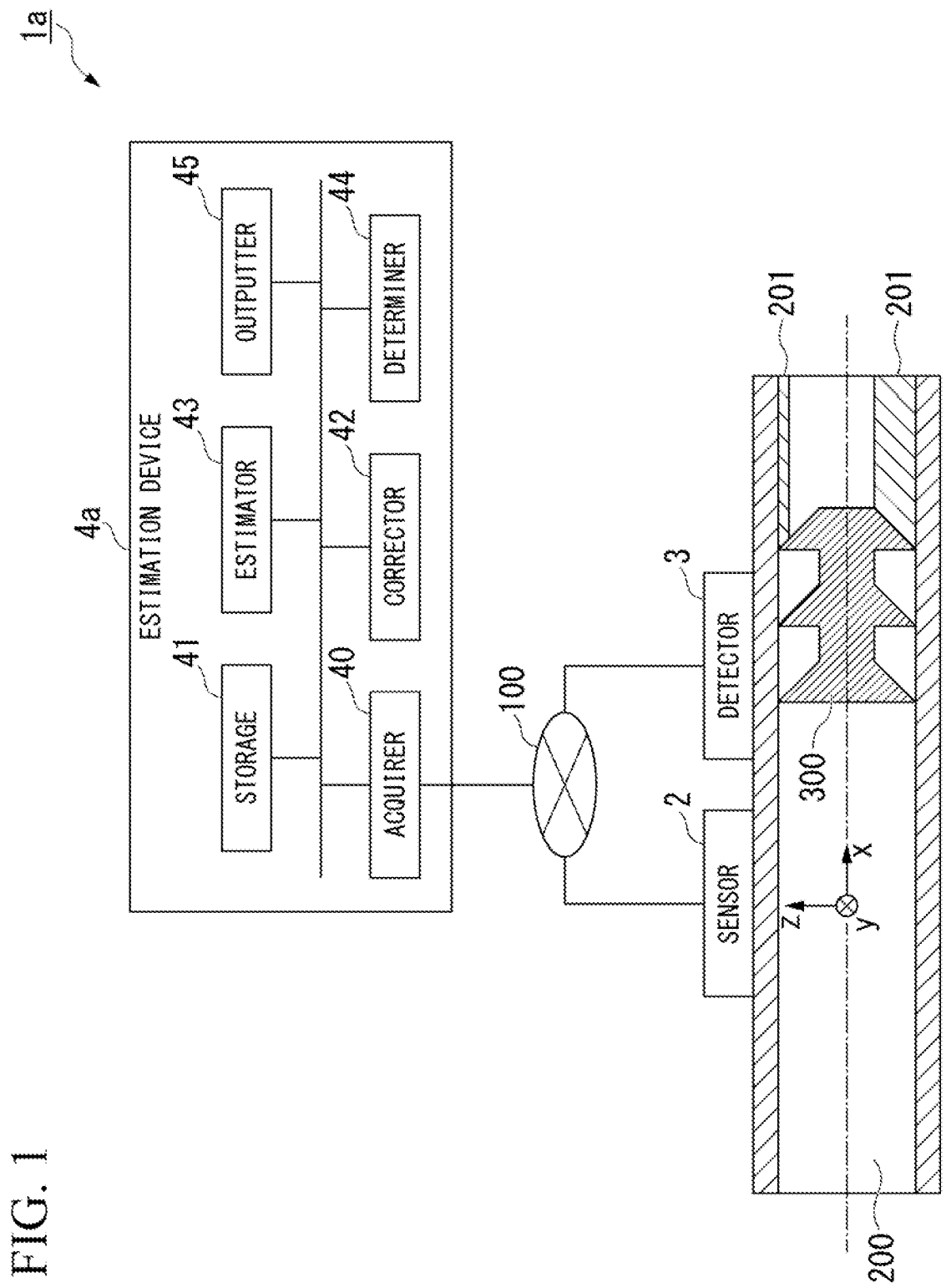
FIG. 1 is a diagram illustrating a configuration example of an estimation system in a first embodiment.

The embodiments of the present invention will be now described herein with reference to illustrative preferred embodiments. Those skilled in the art will recognize that many alternative preferred embodiments can be accomplished using the teaching of the present invention and that the present invention is not limited to the preferred embodiments illustrated herein for explanatory purposes.

An aspect of the present invention is to provide an estimation system, an estimation device, and an estimation method, by which it is possible to keep an estimation error for the thickness of deposits on an inner surface of a pipe within a predetermined range.

Hereinafter, an estimation system, an estimation device, and an estimation method according to embodiments of the present invention will be described in detail with reference to the drawings. Hereinafter, an outline of the embodiments of the present invention will be described first and then details of each embodiment of the present invention will be described.

[Outline]

Embodiments of the present invention make it possible to keep an estimation error for the thickness of deposits on the inner surface of a pipe within a predetermined range. For example, the embodiments of the present invention make it possible to keep an estimation error for the thickness of deposits, such as hydrates, waxes, asphaltene, or scale, which adhere to the inner surface of an oil and gas pipeline, within a predetermined range.

The device disclosed in Japanese Unexamined Patent Application Publication No. 2016-166781 estimates the thickness of the deposits by using four temperature sensors installed on the outer surface of the pipe. However, when the temperature of each fluid on the outside and the inside of the pipe and parameters representing how heat is transferred between the fluid and the pipe (for example, heat transfer coefficient) are not accurately estimated or measured, it is not possible to keep an estimation error for the thickness of the deposits on the inner surface of the pipe within the predetermined range. That is, when an estimation error for the temperature of each fluid on the outside and the inside of the pipe is large, it is not possible to keep an estimation result of the thickness, which is estimated on the basis of the estimated value of the temperature of the fluid, within the predetermined range.

Furthermore, since the temperature of the fluid on the outside and the inside of the pipe changes with the elapse of time, the pressure, flow velocity, and flow of the fluid on the outside and the inside of the pipe change with the elapse of time. Moreover, a part of the pipe may be buried in the seabed. Due to these factors, an estimated value estimated on the basis of the past measured value may have an estimation error. When the estimated value has the estimation error, it is not possible to keep an estimation result of the thickness, which is estimated on the basis of the estimated value having the estimation error, within the predetermined range.

As described above, in U.S. Pat. Nos. 6,644,848, 8,960, 305, Japanese Unexamined Patent Application Publication No. 2016-166781, and US Patent Application Publication No. 2004/0059505, since the estimated value used for estimating the thickness of the deposits is not corrected, a cumulative error when estimating the thickness of deposits on the inner surface of a pipe is maintained.

In the embodiments of the present invention, an estimation system corrects an estimated value (estimated value related to a physical quantity such as heat), which is used for estimating the thickness of deposits on the inner surface of a pipe, by using a measured value of the outer surface temperature of the pipe, which is obtained within a predetermined time from an execution time for a deposit removal process (for example, the elapsed time after a deposit removal instrument has passed through the pipe or the forecast time for when the deposit removal instrument will have passed or would have passed inside the pipe). Since the thickness of the deposits is equal to or less than a threshold value (for example, 0) at the execution time for the deposit removal process, the estimation system corrects the estimated value such that a thickness estimation result becomes equal to or less than a threshold value defined in advance. By correcting the estimated value, an estimation error for the thickness of the deposits is not cumulative. As a consequence, it is possible to keep the estimation error for the thickness of the deposits on the inner surface of the pipe within s predetermined range. Note that it is desirable that this predetermined time be shorter than the time until deposits start to adhere again after removal to the extent that they affect measured values of sensors. Such a predetermined time may be determined, for example, by obtaining in advance the time required for adhesion of the deposits through an experiment and the like.

First Embodiment

<Estimation System>

FIG. 1 is a diagram illustrating a configuration example of an estimation system in the first embodiment. An estimation system 1a of the present embodiment is a system that estimates the thickness of deposits on an inner surface of a pipe on the basis of a measured value of the outer surface temperature of the pipe and an estimated value related to a physical quantity such as heat.

The estimation system 1a includes a plurality of sensors 2, a detector (inferrer) 3, and an estimation device 4a. The estimation device 4a can communicate with the sensors 2 and the detector 3 via a communication line 100. The communication line 100 is a communication line such as the Internet and a wide area network (WAN). The communication line 100 may be either a wired line or a wireless line, or may be both a wired line and a wireless line.

A pipe 200 is a pipe for supplying fluid (pipe through which the fluid flows). Hereinafter, the fluid sent using the pipe 200 is, for example, oil and gas. The oil and gas are produced from a well. The produced oil and gas flow inside the pipe 200. The temperatures of the oil and gas are measured immediately after the oil and gas are produced from the well.

The pipe 200 is installed on the ground or in the sea, for example, and a part or the whole of the pipe 200 may be buried in the ground or the seabed. Deposits 201 adhere to an inner surface of the pipe 200. The deposits 201 are substances contained in the oil and gas sent using the pipe 200, and are, for example, organic substances such as hydrates, waxes, or asphaltene, or an inorganic substance such as scale.

An instrument 300 is an instrument for removing the deposits 201, and is, for example, a pig. The instrument 300 removes the deposits 201 from the inner surface of the pipe 200 by performing a removal process of passing through the inside of the pipe 200 in a pipe axis direction.

The sensor 2 is a temperature sensor, for example, a thermocouple, a resistance temperature detector, a distributed temperature sensor (DTS), or a thermo-camera. In the first embodiment, in order to measure the temperature (temperature distribution) of an outer surface of the pipe 200, a plurality of sensors 2 are installed on the outer surface of the pipe 200 at predetermined intervals in an outer circumferential direction of the pipe 200. Here, when the sensor 2 is a thermo-camera and it is possible to measure the temperature (temperature distribution) in a desired range on the outer surface of the pipe 200 with one thermo-camera, the number of sensors 2 (thermo-cameras) may be one. The sensor 2 measures the outer surface temperature of the pipe 200 at the installation position. Furthermore, the sensor 2 may be embedded in the pipe as well as the outer surface of the pipe as long as it can measure the outer surface temperature of the pipe 200. The sensor 2 outputs the measured value of the outer surface temperature of the pipe 200 to the estimation device 4a via the communication line 100.

Figure 2A:
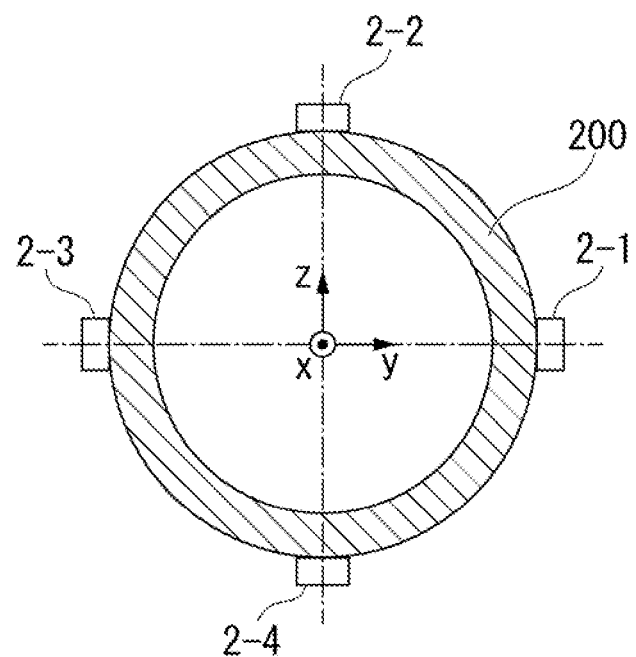
FIG. 2A is a sectional view illustrating an example of an arrangement of sensors in the first embodiment.
Figure 2B:
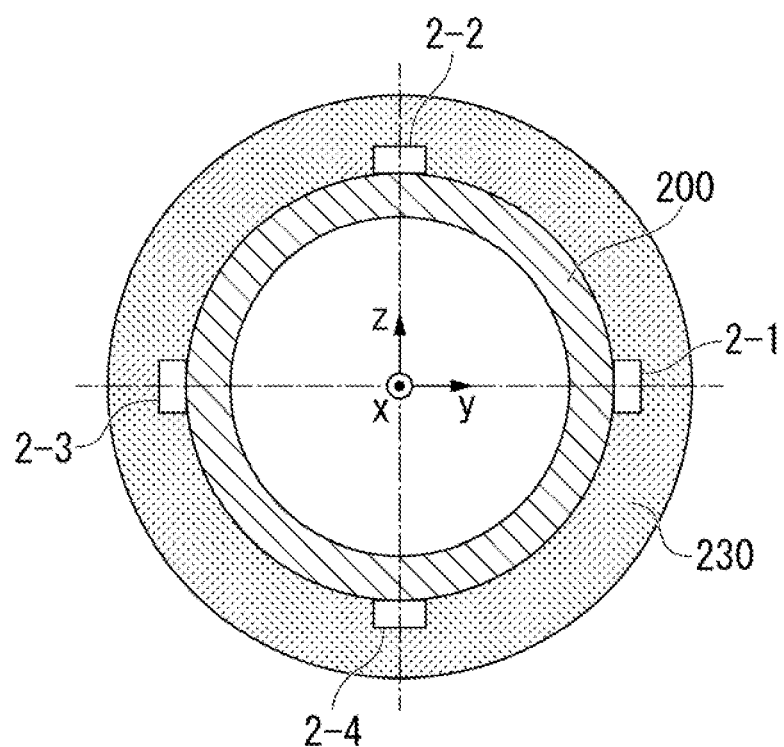
FIG. 2B is a sectional view illustrating an example of an arrangement of sensors in the first embodiment.

FIG. 2 is a sectional view illustrating an example of an arrangement of the sensors in the first embodiment. Note that the sectional view illustrated in FIG. 2 is a sectional view of the pipe 200 in a radial direction. In each of the examples illustrated in FIGS. 2 (a) and (b), four sensors 2 (sensors 2-1 to 2-4) are installed on the outer surface of the pipe 200 at equal intervals (intervals of 90°) along the outer circumferential direction of the pipe 200. With this, the sensors 2-1 to 2-4 can measure the temperature distribution of the outer surface of the pipe 200 in the outer circumferential direction of the pipe 200.

In the example illustrated in (b) of FIG. 2, a heat insulating material 230 that covers the outer surface of the pipe 200 is provided on the outer surface of the pipe 200 together with the sensors 2-1 to 2-4, but in the example illustrated in (a) of FIG. 2, the heat insulating material 230 is not provided on the outer surface of the pipe 200. The heat insulating material 230 is provided in order to reduce an influence of heat on the sensors 2 from outside of the pipe 200. By providing the heat insulating material 230, it is possible to reduce an influence of heat of seawater on the sensors 2-1 to 2-4, for example.

The detector 3 detects that the instrument 300 has passed a predetermined position (for example, an installation position of the detector 3). For example, the detector 3 detects a vibration or a magnetic field generated by the instrument 300 moving inside the pipe 200 in the pipe axis direction, and detects (infers) that the instrument 300 has passed the installation position of the detector 3 (passing time), on the basis of the detection result. Alternately, the detector 3 detects reflection or transmission of ultrasonic waves or radiation, and detects (infers) that the instrument 300 has passed the installation position of the detector 3, on the basis of the detection result.

By detecting (inferring) that the instrument 300 has passed, the detector 3 infers the detection result (detection time) as an execution time (timing) of the removal process for the deposits 201 on the inner surface of the pipe 200. The detector 3 outputs the inference result of the execution time for the removal process for the deposits 201 to the estimation device 4a via the communication line 100.

<Estimation Device>

The estimation device 4a includes an acquirer 40, a storage 41, a corrector 42, an estimator 43, a determiner 44, and an outputter 45. The acquirer 40 acquires the measured values output by the plurality of sensors 2 (measured values of the outer surface temperature of the pipe 200) and the inference result output by the detector 3 (inference result of the execution time for the removal process for the deposits 201). The acquirer 40 acquires the aforementioned measured values and inference result via the communication line 100. The acquirer 40 stores the acquired measured values and inference result in the storage 41. The determiner 44 determines whether the detector 3 has detected (predicted) the passage of the instrument 300. That is, the determiner 44 determines whether the removal process for the deposits 201 has been performed.

The storage 41 has a nonvolatile storage medium (non-transitory storage medium) and stores, for example, programs, models, parameters, and the like. The model represents the relation between the measured values of the outer surface temperature and the thickness of the deposits 201. This model is represented, for example, in the form of a function or a conversion table. When the model is represented in the form of a function, a parameter is an argument "p" of a model "function f (p)".

Such parameters include, for example, the measured value of the outer surface temperature of each sensor 2 of the sensors 2-1 to 2-4, the estimated value of the thermal conductivity of the deposits 201, the estimated value of the heat transfer coefficient inside the pipe 200, and the estimated value of the heat transfer coefficient outside the pipe 200. Each parameter is determined in advance on the basis of, for example, at least one of a past measured value, an empirical value, and analysis results from values estimated by a flow simulator. The analysis process for the estimated values and the measurement may be repeatedly performed in realtime.

If the estimated value used for estimating the thickness of the deposits 201 has a large error with respect to a true value, although the deposits 201 may actually have been removed immediately after the instrument 300 passes, the estimation result of the thickness of the deposits 201 may not be 0 (for example, the estimation result of the thickness of the deposits 201 has a value greatly deviating from 0).

Therefore, the corrector 42 corrects the estimated value used for estimating the thickness of the deposits 201, by using a measured value obtained within a predetermined time from the execution time for the removal process for the deposits 201. The predetermined time is, for example, the time required for changes in the outer surface temperature of the pipe 200 (measured values of the sensors 2) due to the passage of the instrument 300 to converge and the outer surface temperature of the pipe 200 (measured values of the sensors 2) to stabilize, and may be, for example, set as 1 minute to several minutes, 1 hour to several hours, or 1 day to several days. The corrector 42 corrects the estimated value used for estimating the thickness of the deposits 201 (when a plurality of estimated values are used, at least one of the plurality of estimated values) such that the estimation result of the thickness of the deposits 201 becomes equal to or less than a threshold value (for example, 0). Note that the threshold value is defined in advance.

The estimated value used for estimating the thickness of the deposits 201 is an estimated value related to a physical quantity such as heat in the environment around the pipe 200, and is, for example, at least one of an estimated value of the thermal conductivity of the deposits 201, an estimated value of the temperature of oil and gas inside the pipe 200, an estimated value of the temperature of fluid (for example, seawater) outside the pipe 200, an estimated value of the heat transfer coefficient inside the pipe 200 (for example, deposits, oil, and gas), and an estimated value of the heat transfer coefficient outside the pipe 200 (for example, seawater and seabed).

The estimator 43 estimates the thickness of the deposits 201 on the basis of the corrected estimated value and the measured values of the outer surface temperature of the pipe 200. A method of estimating the thickness of deposits on the basis of the measured values of the outer surface temperature of a pipe is disclosed in WO 2019/202981. Note that the method, in which the estimator 43 estimates the thickness of the deposits 201 on the basis of the measured values of the outer surface temperature of the pipe 200, is not limited to the method disclosed in WO 2019/202981.

The estimator 43 outputs the estimation result of the thickness of the deposits 201 to the outputter 45. The estimator 43 may store the estimation result of the thickness of the deposits 201 in the storage 41, or may store the estimation result of the thickness of the deposits 201 in the storage 41 and output the estimation result to the outputter 45. The estimator 43 may acquire an instruction signal indicating whether to end the estimation process from an external terminal (not illustrated) via the acquirer 40. Note that details of the process performed in the estimator 43 will be described below.

The outputter 45 is a functional part that outputs data to the external terminal (not illustrated). For example, the outputter 45 outputs the estimation result of the thickness of the deposits 201 to the external terminal. The external terminal is, for example, a display device such as a liquid crystal display or an organic EL display. The display device displays an image (for example, a graph and a sectional view) representing the estimation result of the thickness of the deposits 201. An operator can confirm the estimation result of the thickness displayed on the display device.

Some or all of the aforementioned acquirer 40, corrector 42, estimator 43, determiner 44, and outputter 45 may be implemented in a software manner by a processor, such as a central processing unit (CPU), which executes the program stored in the storage 41. That is, functions of some or all of the aforementioned acquirer 40, corrector 42, estimator 43, determiner 44, and outputter 45 may be implemented by the cooperation of software and hardware resources.

The aforementioned program may be stored in a computer readable storage medium. The computer readable storage medium is, for example, a non-transitory storage medium such as a portable medium, such as a flexible disk, a magneto-optical disc, a read only memory (ROM), and a compact disc read only memory (CD-ROM), and a storage device such as a hard disk built in a computer system. The program may be received by the acquirer 40 via the communication line 100.

Note that some or all of the aforementioned acquirer 40, corrector 42, estimator 43, determiner 44, and outputter 45 may be implemented by hardware. For example, some or all of them may be implemented by an electronic circuit (or circuitry) using a large scale integration (LSI), an application specific integrated circuit (ASIC), a programmable logic device (PLD), a field-programmable gate array (FPGA), and the like.

<Process Performed by Estimator>

The estimator 43 estimates the thickness of the deposits 201 at predetermined positions (for example, the installation positions of the sensors 2) on the basis of the measured value of the outer surface temperature of at least one sensor 2. For example, the estimator 43 estimates the shape (thickness distribution) of the deposits 201 as expressed by Formula 1 below on the basis of the measured values (temperature distribution) of the outer surface temperature of the respective installation positions of the sensors 2-1 to 2-4.

$$th = f(p_1, p_2, p_3, p_4) \tag{1}$$

In Formula 1 above, "th" represents the estimation result of the thickness of the deposits 201 at the installation position of at least one sensor 2. "f" represents a function defined in advance. The parameter $p_1$ represents the measured value of the outer surface temperature of at least one sensor 2. The parameter $p_2$ represents the estimated value of the thermal conductivity of the deposits 201. The parameter $p_3$ represents the estimated value or measured value of the temperature of the fluid (oil and gas) inside the pipe 200. The temperature of the oil and gas is estimated, for example, on the basis of temperature measured immediately after the oil and gas are produced from the well. The parameter $p_4$ represents the estimated value or measured value of the temperature of the fluid outside the pipe 200. When the pipe 200 is installed on the ground, the fluid outside the pipe 200 is the atmosphere. When the pipe 200 is installed in the seabed, the fluid outside the pipe 200 is seawater.

Furthermore, in order to be able to estimate the thickness of the deposits 201 even when a multiphase flow is formed inside the pipe 200 (when there is a bias in the way heat is transferred), the storage 41 may store in advance the estimated value of the heat transfer coefficient of the fluid inside the pipe 200 as a variable. The estimator 43 may estimate the thickness of the deposits 201 as expressed by Formula 2 below on the basis of the estimated value of the heat transfer coefficient inside the pipe 200 and the estimated value of the heat transfer coefficient outside the pipe 200.

$$th = f(p_1, p_2, p_3, p_4, p_5) \tag{2}$$

In Formula 2 above, the parameter $p_5$ represents the estimated value of the heat transfer coefficient inside the pipe 200. With this, even when the multiphase flow is formed inside the pipe 200, the estimator 43 can estimate the thickness of the deposits 201 in consideration of how heat is transferred inside the pipe 200.

Furthermore, in order to be able to estimate the thickness of the deposits 201 even when a part of the pipe 200 is buried in the seabed or the ocean current is strong, the storage 41 may store the estimated value of the heat transfer coefficient outside the pipe 200 as a variable. The estimator 43 may estimate the thickness of the deposits 201 as expressed by Formula 3 below on the basis of the estimated value of the heat transfer coefficient inside the pipe 200 and the estimated value of the heat transfer coefficient outside the pipe 200.

$$th = f(p_1, p_2, p_3, p_4, p_5, p_6) \tag{3}$$

In Formula 3 above, the parameter $p_6$ represents the estimated value of the heat transfer coefficient outside the pipe 200. With this, even when a part of the pipe 200 is buried in, for example, the seabed, the estimator 43 can estimate the thickness of the deposits 201 in consideration of how heat is transferred outside the pipe 200.

The estimator 43 may estimate the thickness of the deposits 201 as expressed by Formula 4 below on the basis of the estimated value of the heat transfer coefficient outside the pipe 200.

$$th = f(p_1, p_2, p_3, p_4, p_6) \tag{4}$$

With this, the estimator 43 can estimate the thickness of the deposits 201 in consideration of how heat is transferred outside the pipe 200 without estimating the heat transfer coefficient inside the pipe 200.

<Example of Deposits Adhering to Pipe>

Figure 3:
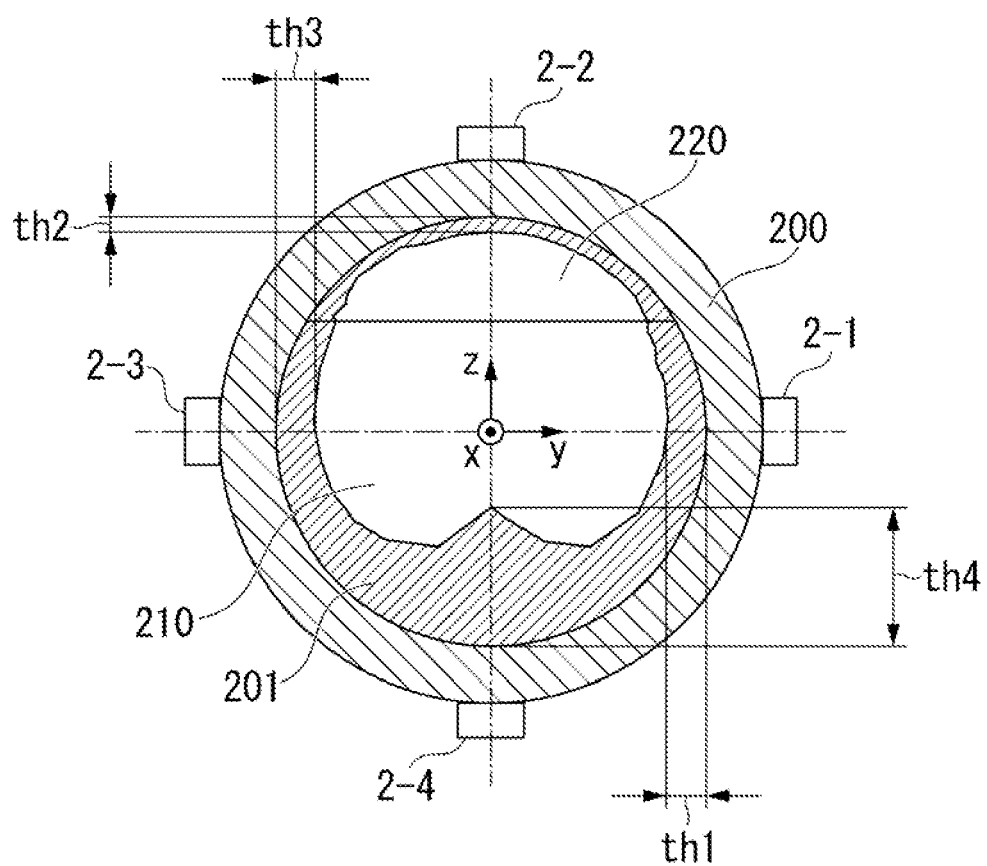
FIG. 3 is a sectional view illustrating an example of a pipe, in which deposits have adhered to an inner surface of the pipe, in the first embodiment.

FIG. 3 is a sectional view illustrating an example of a pipe, in which deposits adhere to an inner surface of the pipe, in the first embodiment. Note that the sectional view illustrated in FIG. 3 is the sectional view of the pipe 200 in the radial direction, as in FIG. 2. In the deposits 201 illustrated in FIG. 3, the thickness at the installation position of the sensor 2-1 is "$th_1$", the thickness at the installation position of the sensor 2-2 is "$th_2$", the thickness at the installation position of the sensor 2-3 is "$th_3$", and the thickness at the installation position of the sensor 2-4 is "$th_4$".

In FIG. 3, the multiphase flow of oil 210 and gas 220 is formed as an example inside the pipe 200. That is, the gas 220 is gathered near the ceiling inside the pipe 200. When the multiphase flow is formed inside the pipe 200, since there is a bias in the way heat is transferred inside the pipe 200, the way heat is transferred changes according to the position of the pipe 200 in the outer circumferential direction. Due to such a change, the thickness of the deposits 201 may be non-uniform as in the thicknesses "$th_1$" to "$th_4$". In FIG. 3, the thickness "$th_4$" is the thickest and the thickness "$th_1$" is the thinnest as an example.

Note that, when a part of the pipe 200 is buried in, for example, the seabed, the way heat is transferred changes according to the position of the pipe 200 in the outer circumferential direction due to the influence of the burial. Furthermore, when the ocean current is strong outside the pipe 200, the way heat is transferred changes according to the position of the pipe 200 in the outer circumferential direction due to the influence of the ocean current.

Figure 4:
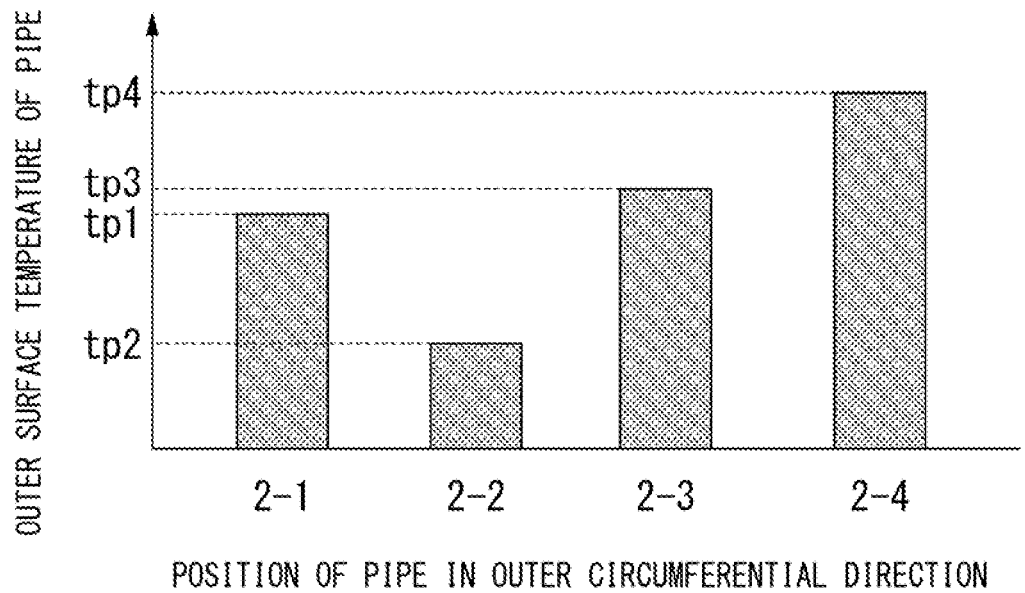
FIG. 4 is a diagram illustrating an example of the outer surface temperature of the pipe in the first embodiment.

FIG. 4 is a diagram illustrating an example of the outer surface temperature of the pipe in the first embodiment. The horizontal axis denotes the position of the pipe 200 in the outer circumferential direction (respective installation position of the sensors 2-1 to 2-4). The vertical axis denotes the measured value "tp" of the outer surface temperature of the pipe 200 illustrated in FIG. 3. In the example illustrated in FIG. 4, the measured value by the sensor 2-1 is "$tp_1$", the measured value by the sensor 2-2 is "$tp_2$", the measured value by the sensor 2-3 is "tp$_3$", and the measured value by the sensor 2-4 is "tp$_4$". In the example illustrated in FIG. 4, the measured value "tp$_2$" by the sensor 2-2 is the lowest. This is because the thermal conductivity of the gas 220 gathered near the ceiling inside the pipe 200 illustrated in FIG. 3 is lower than that of the oil 210. Furthermore, in the example illustrated in FIG. 4, the outer surface temperature of the pipe 200 is higher in the order of the measured value by the sensor 2-4, the measured value by the sensor 2-3, and the measured value by the sensor 2-2.

Figure 5:
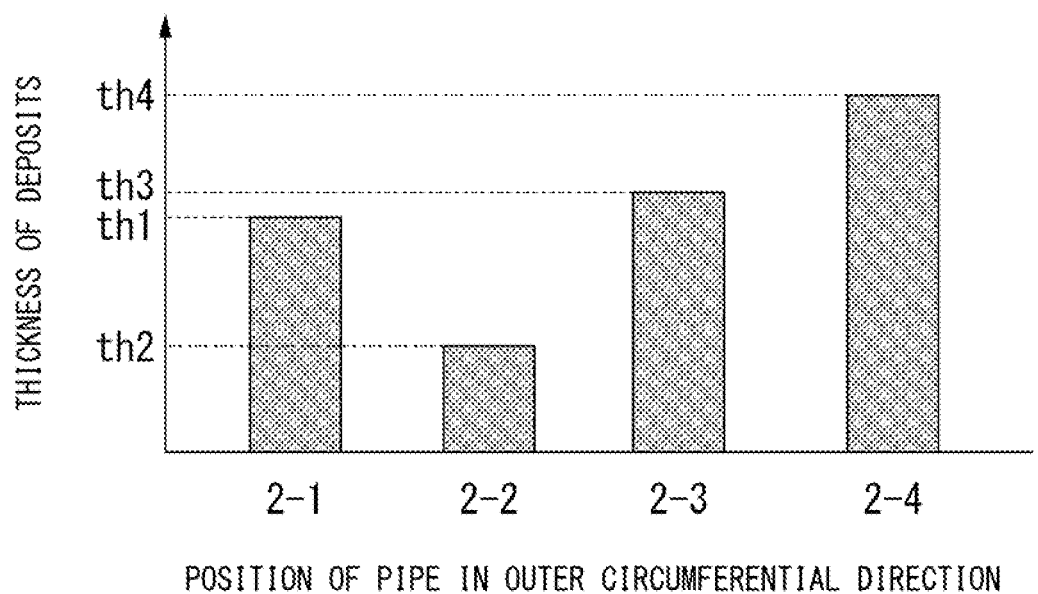
FIG. 5 is a diagram illustrating an example of a thickness estimation result in the first embodiment.

FIG. 5 is a diagram illustrating an example of the thickness estimation result in the first embodiment. The horizontal axis denotes the position of the pipe 200 in the outer circumferential direction (respective installation position of the sensors 2-1 to 2-4). The vertical axis denotes the estimation result of the thickness of the deposits 201 in the pipe 200 illustrated in FIG. 3. Note that the estimation result illustrated in FIG. 5 is obtained by performing the aforementioned process in the estimator 43.

The estimator 43 estimates the thickness of the deposits 201 for each sensor 2 of the sensors 2-1 to 2-4 by using the measured values of the outer surface temperature of the pipe 200 illustrated on the vertical axis in FIG. 4. For example, the estimator 43 estimates the thickness of the deposits 201 for each sensor 2 by using the measured values of the outer surface temperature and any one of formulas (1) to (4) above. Note that the estimation result of the thickness illustrated on the vertical axis in FIG. 5 is an example.

<Operation of Estimation System>

Figure 6:
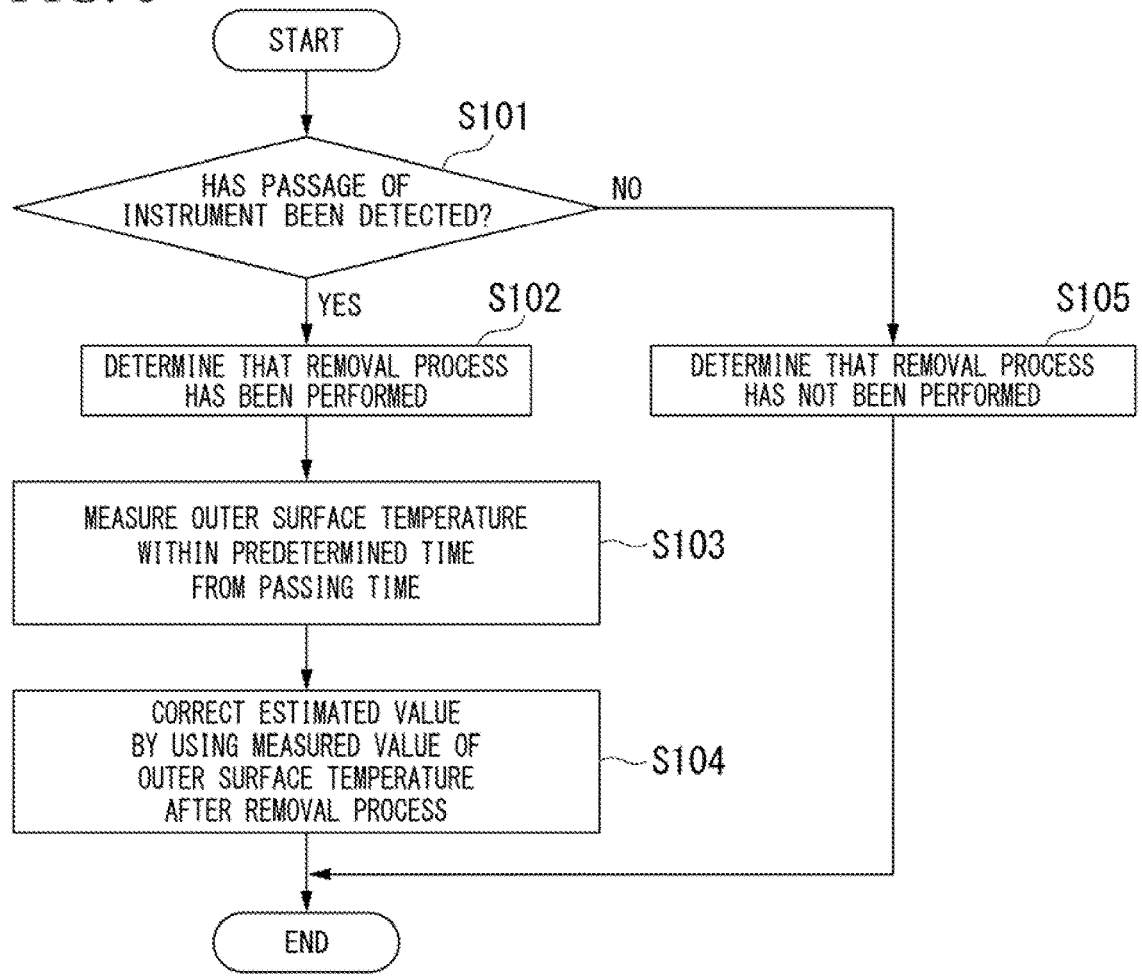
FIG. 6 is a flowchart illustrating an operation example of the estimation system in the first embodiment.

FIG. 6 is a flowchart illustrating an operation example of the estimation system in the first embodiment. The process (correction flow of estimated value) of the flowchart illustrated in FIG. 6 can be preferentially performed at any timing in a normal operation flow (flow for estimating the thickness of the deposits 201 based on the detection results (temperature) by the sensors 2).

When the process of the flowchart illustrated in FIG. 6 is started, the determiner 44 first determines whether the detector 3 has detected (predicted) the passage of the instrument 300. That is, the determiner 44 determines whether the removal process for the deposits 201 has been performed (step S101). For example, the determiner 44 determines whether the removal process for the deposits 201 has been performed, on the basis of reception or non-reception of a notification indicating that the removal process for the deposits 201 has been performed.

When the determiner 44 determines that the detector 3 has not detected (predicted) the passage of the instrument 300 (step S101: NO), the determiner 44 determines that the removal process for the deposits 201 in the pipe 200 has not been performed (step S105). The estimation system 1a ends the estimation process illustrated in FIG. 6.

On the other hand, when the determiner 44 determines that the detector 3 has detected (predicted) the passage of the instrument 300 (step S101: YES), the determiner 44 determines that the removal process for the deposits 201 in the pipe 200 has been performed (step S102). The sensors 2 measure the outer surface temperature within a predetermined time from the passing time of the instrument 300 (step S103). In this way, separately from the measurement of the outer surface temperature for estimating the thickness of the deposits 201, the sensors 2 measure the outer surface temperature for the correction of the estimated value. Of course, the present invention is not limited thereto, and for example, the estimated value may be corrected using the first measurement result of the outer surface temperature (measurement result for estimating the thickness of the deposits 201) after the execution time for the removal process can be predicted.

Subsequently, the corrector 42 corrects each estimated value used for estimating the thickness of the deposits 201, by using the measured value of the outer surface temperature after the removal process (step S104). Specifically, the corrector 42 corrects the estimated value used for estimating the thickness of the deposits 201 (when a plurality of estimated values are used, at least one of the plurality of estimated values) such that the estimation result of the thickness of the deposits 201 becomes equal to or less than a threshold value (for example, 0).

As described above, in the present embodiment, the corrector 42 corrects at least one estimated value used for estimating the thickness of the deposits 201, by using the measured value of the outer surface temperature of the pipe 200, which is obtained within a predetermined time from the detection result (detection time) of the detector 3 as the execution time for the removal process. Here, the corrector 42 may correct the estimated value such that the estimation result of the thickness of the deposits 201 becomes equal to or less than a threshold value (for example, 0) defined in advance. By correcting the estimated value, the estimation error for the thickness of the deposits 201 is not cumulative, so that it is possible to keep the estimation error for the thickness of the deposits 201 on the inner surface of the pipe 200 within the predetermined range. Furthermore, since the estimator 43 acquires the measured value of the outer surface temperature of the pipe 200 for each sensor 2, it is possible to estimate the shape (thickness distribution) of the deposits 201.

Note that the sensors 2-1 to 2-4 may be arranged differently from the arrangement illustrated in FIG. 2. For example, the sensors 2-1 to 2-4 may be installed on the outer surface of the pipe 200 at uneven intervals in the outer circumferential direction of the pipe 200. For example, as illustrated in FIG. 3, the sensors 2-1 to 2-4 may be densely installed in the vicinity of a position (for example, the bottom of the pipe 200) where the deposits 201 are likely to be thick, or may be sparsely installed in the vicinity of a position (for example, the top of the pipe 200) where the deposits 201 are unlikely to be thick. Furthermore, the set of the plurality of sensors 2 (sensors 2-1 to 2-4) installed in the outer circumferential direction may be installed on the outer surface of the pipe 200 at predetermined intervals in the pipe axis direction of the pipe 200. With this, it is possible to keep the estimation error for the thickness of the deposits 201 on the inner surface of the pipe 200 within the predetermined range also in the pipe axis direction of the pipe 200.

Furthermore, instead of removing the deposits 201 by allowing the instrument 300 to pass through inside the pipe 200, the deposits 201 may be removed by introducing an inhibitor for inhibiting the formation of the deposits 201 into the pipe 200. In such a case, as the detector 3, it is possible to use a sensor capable of detecting (or inferring) the presence or absence of the inhibitor in the pipe 200, a sensor capable of detecting (or inferring) the introducing timing of a device and the like that introduce the inhibitor, and the like. The method of removing the deposits 201 from the inside of the pipe 200 is not limited to the aforementioned methods and any method may be applied.

<First Modification>

In the aforementioned embodiment, the sensors 2-1 to 2-4 are used only to measure the outer surface temperature of the pipe 200. In the present modification, the sensors 2-1 to 2-4 illustrated in (a) of FIG. 2 are used to measure a heat flux on the outer surface of the pipe 200 (for example, a heat flux in a direction (normal direction) substantially orthogonal to the outer surface of the pipe 200), in addition to the outer surface temperature of the pipe 200. The sensors 2-1 to 2-4 transmit the measured values of the outer surface temperature of the pipe 200 and the measured value of the heat flux at the installation positions thereof to the estimator 43 via the communication line 100.

In the present modification, on the basis of the measured value of the outer surface temperature at the installation position of at least one sensor 2 and the measured value of the heat flux, the estimator 43 estimates the thickness of the deposits 201 at the installation position of the sensor 2 as expressed by Formula 5 below.

$$th = f(p_1, p_2, p_3, p_4, p_5, p_6, p_7) \quad (5)$$

In Formula 5 above, the parameter $p_7$ represents the measured value of the heat flux on the outer surface of the pipe 200, which is measured by at least one sensor 2 of the sensors 2-1 to 2-4. Note that in Formula 5 above, the parameter $p_5$ and the parameter $p_6$ are not essential and may be omitted.

Even when both the heat environment outside the pipe 200 and the heat environment inside the pipe 200 are changed, the estimator 43 separates the influence of an environmental change on the outside of the pipe 200 from the influence of an environmental change on the inside of the pipe 200 by using the measured value of the heat flux on the outer surface of the pipe 200. With this, by correcting the influence of the environment on the outside and the inside of the pipe 200 by using the measured value of the heat flux, it is possible to keep the estimation error for the thickness of the deposits 201 on the inner surface of the pipe 200 within the predetermined range.

The estimator 43 may notify an operator of the estimation result regarding heat outside and inside the pipe 200 by using the outputter 45. With this, the estimator 43 can notify the operator of information useful for managing the pipeline, for example. The information useful for managing the pipeline includes, for example, a temperature change in the atmosphere or seawater outside the pipe 200, each temperature of oil and gas inside the pipe 200, and a flow mode of a multiphase flow inside the pipe 200.

<Second Modification>

Figure 7:
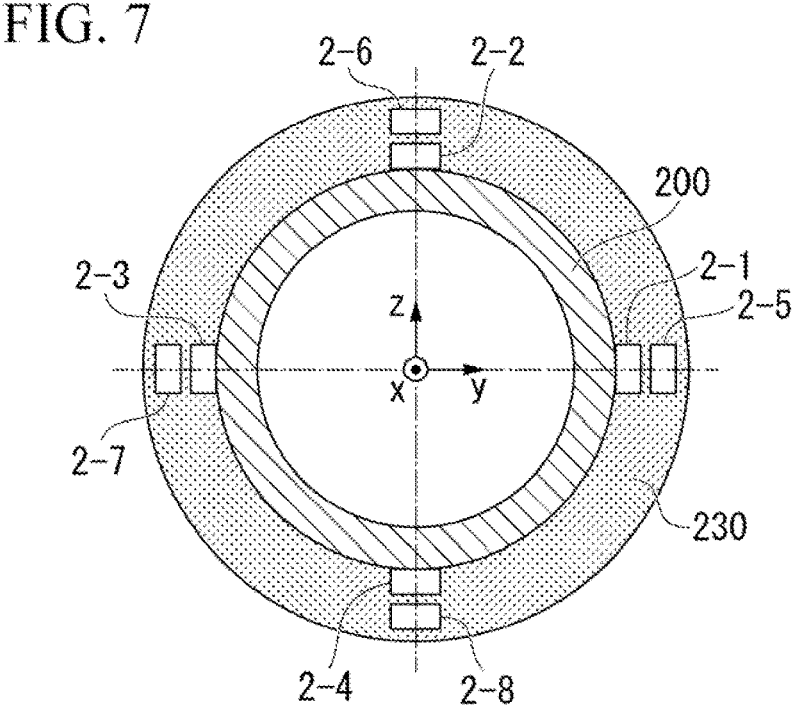
FIG. 7 is a sectional view illustrating an arrangement example of sensors in a second modification of the first embodiment.

FIG. 7 is a sectional view illustrating a pipe configuration example in the second modification of the first embodiment. Note that the sectional view illustrated in FIG. 7 is a sectional view of the pipe 200 in the radial direction. In the present modification, even when the heat insulating material 230 is provided on the outer surface of the pipe 200 as illustrated in (b) of FIG. 2, it is possible to measure the heat flux on the outer surface of the pipe 200 in addition to the outer surface temperature of the pipe 200.

As illustrated in FIG. 7, in the present modification, sensors 2-5 to 2-8 are provided in addition to the sensors 2-1 to 2-4. The sensors 2-5 to 2-8 are installed at positions in the heat insulating material 230, which are separated from the sensors 2-1 to 2-4 by a predetermined distance in the radial direction of the pipe 200, at equal intervals (equal angle intervals, for example, intervals of 90°) along the outer circumferential direction of the pipe 200. The sensors 2-1 to 2-4 and the sensors 2-5 to 2-8 are provided corresponding to each other.

Each of the sensors 2-5 to 2-8 measures the internal temperature of the heat insulating material 230 according to the outer surface temperature of the pipe 200 at the installation position thereof. Each of the sensors 2-5 to 2-8 transmits the measured value of the internal temperature of the heat insulating material 230 at the installation position thereof to the estimator 43 via the communication line 100.

On the basis of the measured value of the outer surface temperature at the installation position of at least one of the sensors 2-1 to 2-4 and the measured value of the internal temperature of the heat insulating material 230 at the installation position of at least corresponding one of the sensors 2-5 to 2-8, the estimator 43 estimates the thickness of the deposits 201 at the installation positions of the sensors 2-1 to 2-4 as expressed by Formula 6 below.

$$th = f(p_1, p_2, p_3, p_4, p_5, p_6, p_8) \quad (6)$$

In Formula 6 above, the parameter $p_8$ represents the measured value of the internal temperature of the heat insulating material 230, which is measured by at least one of the sensors 2-5 to 2-8. Note that in Formula 6 above, the parameter $p_5$ and the parameter $p_6$ are not essential and may be omitted.

Also in the present modification, similarly to the first modification, by correcting the influence of the environment on the outside and the inside of the pipe 200, it is possible to keep the estimation error for the thickness of the deposits 201 on the inner surface of the pipe 200 within the predetermined range. Note that, also in the present modification, the estimator 43 may notify an operator of the estimation result regarding heat outside and inside the pipe 200 by using the outputter 45.

Second Embodiment

<Estimation System>

Figure 8:
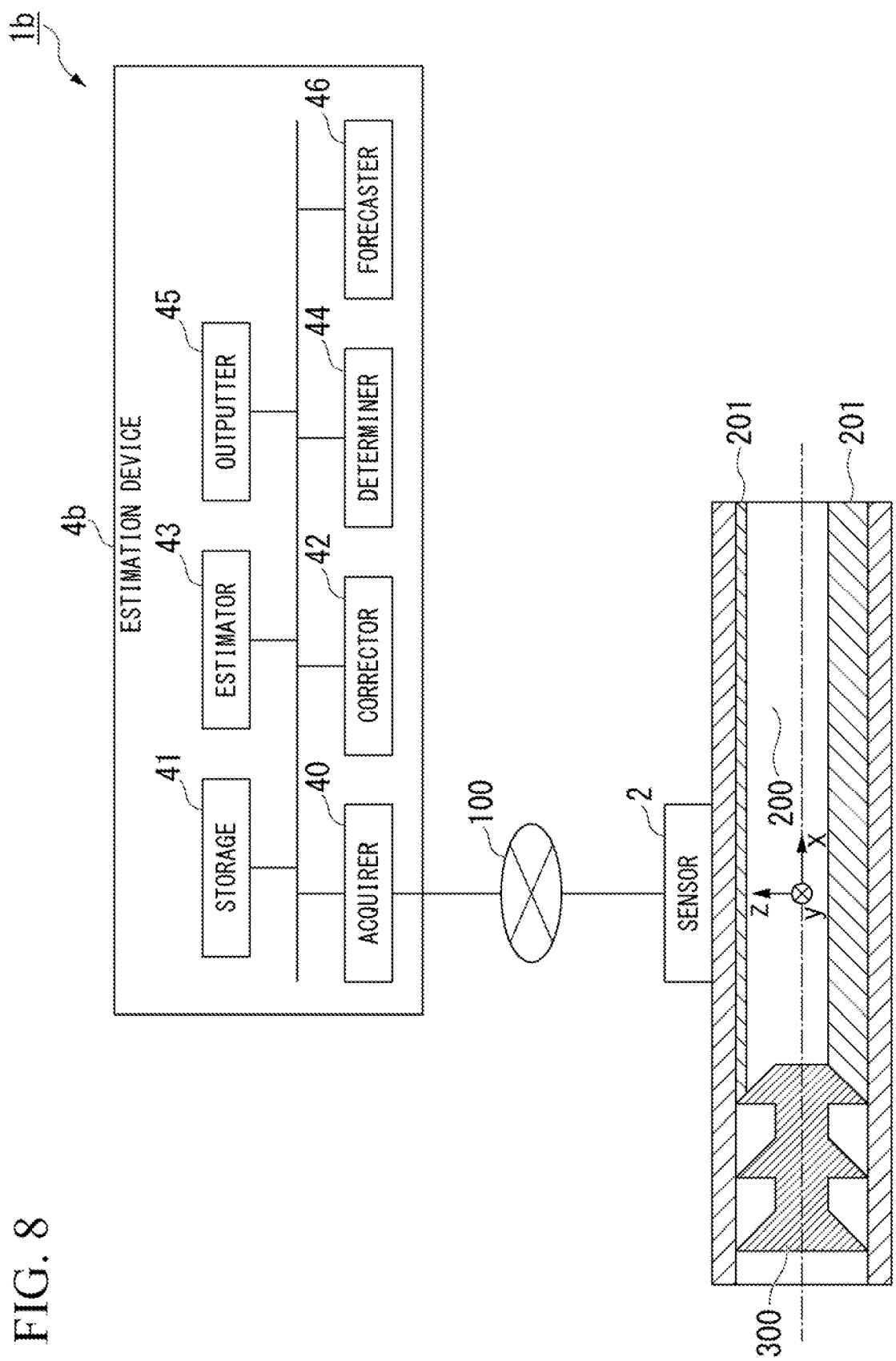
FIG. 8 is a diagram illustrating a configuration example of an estimation system in a second embodiment.

FIG. 8 is a diagram illustrating a configuration example of an estimation system in a second embodiment. An estimation system 1b of the present embodiment has a configuration in which the estimation device 4a of the estimation system 1a illustrated in FIG. 1 is replaced with an estimation device 4b. The estimation system 1b illustrated in FIG. 8 is a system that estimates the thickness of deposits on an inner surface of a pipe, similarly to the estimation system 1a illustrated in FIG. 1. However, the estimation system 1b illustrated in FIG. 8 is different from the estimation system 1a illustrated in FIG. 1 in that the estimation system 1b forecasts (infers) that the instrument 300 passes or has passed a predetermined position of the pipe 200 and infers the forecast result (forecast time) as the execution time when the removal process for the deposits is performed (passing time when the instrument 300 passes the predetermined position in the pipe 200). The predetermined position of the pipe 200 is, for example, the installation position of the sensor 2.

<Estimation Device>

An estimation device 4b has a configuration in which a forecaster (inferrer) 46 is added to the estimation device 4a illustrated in FIG. 1. The forecaster 46 acquires at least one of information on the launch time when the instrument 300 (pig) has been launched from a pig launcher (not illustrated) and information on the reception time when the instrument 300 has been received by a pig receiver (not illustrated). Note that the estimation device 4b acquires the aforementioned information on the launch time or the reception time directly from the pig or from a control terminal (not illustrated) that controls at least one of the pig launcher and the pig receiver.

The forecaster 46 acquires, from the storage 41, at least one of information on the position where the pig has been launched and information on the position where the pig has been received. On the basis of at least one of the time when the pig has been launched/the position where the pig has been launched and the time when the pig has been received/the position where the pig has been received, the predetermined position, and the movement speed of the instrument 300, the forecaster 46 forecasts (infers) that the instrument 300 passes or has passed (passing time) the predetermined position. By forecasting (inferring) that the instrument 300 passes or has passed, the forecaster 46 infers the forecast result (forecast time) as the execution time (timing) of the removal process for the deposits 201 on the surface of the pipe 200. The forecaster 46 stores, in the storage 41, the forecast result of the passing time when the instrument 300 passes the predetermined position, that is, the inference result of the execution time for the removal process for the deposits 201. The determiner 44 determines whether the forecaster 46 has forecasted (predicted) the passage of the instrument 300. That is, the determiner 44 determines whether the removal process for the deposits 201 has been performed.

The corrector 42 corrects the estimated value used for estimating the thickness of the deposits 201, by using the measured value of the outer surface temperature of the pipe 200, which is obtained within a predetermined time (for example, within 1 second) from the predicted time for when the instrument 300 will have passed or would have passed the predetermined position. Of course, when forecasting the passing time when the instrument 300 passes the installation position of the detector 3, the passing time may be forecasted not only on the basis of the launch or reception timing of the pig, the predicted passage position, and the pig movement speed as described above, but also on the basis of a movement time stored in advance. Specifically, a movement time until the pig is launched from the pig launcher and then passes the predicted passage position, or a movement time until the pig passes the predicted passage position and then is received by the pig receiver is stored in the storage 41 in advance as an empirical value or a calculated value, and the passing time can be forecasted (predicted) on the basis of the empirical value or the calculated value stored in the storage 41.

As described above, in the present embodiment, the corrector 42 corrects at least one estimated value used for estimating the thickness of the deposits 201, by using the measured value of the outer surface temperature of the pipe 200, which is obtained within a predetermined time from the forecast result (forecast time) of the forecaster 46 as the execution time for the removal process. Here, the corrector 42 may correct the estimated value such that the estimation result of the thickness of the deposits 201 becomes equal to or less than a threshold value (for example, 0) defined in advance. By correcting the estimated value, the estimation error for the thickness of the deposits 201 is not cumulative, so that it is possible to keep the estimation error for the thickness of the deposits 201 on the inner surface of the pipe 200 within the predetermined range. Thus, even when the detector 3 of the first embodiment is not provided, it is possible to keep the estimation error for the thickness of the deposits 201 on the inner surface of the pipe 200 within the predetermined range in the present embodiment. Furthermore, even though the detector 3 of the first embodiment is provided, even when the detector 3 of the first embodiment is not able to predict the execution time for the removal process for the deposits 201 by detecting the passage of the instrument 300, it is possible to keep the estimation error for the thickness of the deposits 201 on the inner surface of the pipe 200 within the predetermined range in the present embodiment. Note that the estimation system 1b includes the detector 3 of the first embodiment and the forecaster 46 of the second embodiment, so that at least one or both of the forecast of the passage of the pig by the forecaster 46 and the detection of the passage of the pig by the detector 3 may be performed.

Although the embodiments of the present invention have been described in detail with reference to the drawings, specific configurations are not limited to these embodiments and the present invention may also include design and the like within a range not departing from the spirit of the present invention.

For example, the forecaster 46 may estimate (regard) that the instrument 300 has passed when the estimation result of the thickness of the deposits 201 is suddenly changed (reduced), and perform the correction flow of the estimated value. Alternatively, the forecaster 46 may estimate (regard) that the instrument 300 has passed when the measured values (outer surface temperature) of the sensors 2 are suddenly changed, and perform the correction flow of the estimated value.

[Supplementary Note]

The estimation system according to an aspect of the present invention includes: an acquirer (40) configured to acquire a measured value of an outer surface temperature of a pipe (200) through which fluid flows; an inferrer (3) configured to infer an execution time for a removal process for deposits on an inner surface of the pipe (200); a corrector (42) configured to correct an estimated value used for estimating a thickness of the deposits, by using the measured value of the outer surface temperature of the pipe (200), which is acquired within a predetermined time from an inference result of the execution time for the removal process for the deposits; and an estimator (43) configured to estimate the thickness of the deposits based on the corrected estimated value and the measured value of the outer surface temperature of the pipe (200).

Furthermore, in the estimation system according to an aspect of the present invention, the corrector (42) is configured to correct the estimated value such that an estimation result of the thickness of the deposits becomes equal to or less than a threshold value defined in advance.

Furthermore, in the estimation system according to an aspect of the present invention, the corrector (42) is configured to correct at least one of the estimated value of a thermal conductivity of the deposits, the estimated value of a temperature of the fluid inside the pipe (200), the estimated value of a temperature of the fluid outside the pipe (200), the estimated value of a heat transfer coefficient inside the pipe (200), or the estimated value of a heat transfer coefficient outside the pipe (200).

Furthermore, in the estimation system according to an aspect of the present invention, the acquirer (40) is configured to further acquire at least one of a measured value of a heat flux on an outer surface of the pipe (200) or a measured value of an internal temperature of a heat insulating material that covers the outer surface of the pipe (200), and the estimator (43) is configured to estimate the thickness of the deposits based on at least one of the measured value of the heat flux on the outer surface of the pipe (200) or the measured value of the internal temperature of the heat insulating material, the measured value of the outer surface temperature of the pipe (200), and the corrected estimated value.

Furthermore, in the estimation system according to an aspect of the present invention, the inferrer (3) is configured to infer the execution time for the removal process for the deposits in accordance with a time when the removal process for the deposits has been detected or predicted, and the corrector (42) is configured to correct the estimated value by using the measured value of the outer surface temperature of the pipe (200), which is acquired within the predetermined time from the inference result of the execution time for the removal process for the deposits.

Furthermore, in the estimation system according to an aspect of the present invention, the removal process for the deposits is performed by an instrument that moves in the pipe (200).

Furthermore, in the estimation system according to an aspect of the present invention, the inferrer (3) is configured to detect a vibration or a magnetic field generated by the instrument moving in the pipe (200) to infer the execution time for the removal process for the deposits.

Furthermore, in the estimation system according to an aspect of the present invention, the removal process for the deposits is performed by introducing an inhibitor for inhibiting a formation of the deposits into the pipe (200).

Furthermore, in the estimation system according to an aspect of the present invention, the estimation system further includes a sensor (2) configured to measure the outer surface temperature of the pipe (200), and the acquirer (40) is configured to acquire the measured value from the sensor.

Furthermore, in the estimation system according to an aspect of the present invention, the estimation system further includes a hardware-processor configured to execute a program stored in a memory to implement the acquirer (40), the inferrer (3), the corrector (42), and the estimator (43).

An estimation device (4a) according to an aspect of the present invention includes a corrector (42) configured to correct an estimated value used for estimating a thickness of deposits on an inner surface of the pipe (200) through which fluid flows, by using a measured value of an outer surface temperature of the pipe (200), which is acquired within a predetermined time from an inference result of an execution time for a removal process for the deposits; and an estimator (43) configured to estimate the thickness of the deposits based on the corrected estimated value and the measured value of the outer surface temperature of the pipe (200).

An estimation method according to an aspect of the present invention is an estimation method performed by an estimation system, and the estimation method includes: acquiring, by an acquirer (40), a measured value of an outer surface temperature of a pipe (200) through which fluid flows; inferring, by an inferrer (3), an execution time for a removal process for deposits on an inner surface of the pipe (200); correcting, by a corrector (42), an estimated value used for estimating a thickness of the deposits, by using the measured value of the outer surface temperature of the pipe (200), which is acquired within a predetermined time from an inference result of the execution time for the removal process for the deposits; and estimating, by an estimator (43), the thickness of the deposits based on the corrected estimated value and the measured value of the outer surface temperature of the pipe (200).

Furthermore, the estimation method according to an aspect of the present invention further includes: correcting, by the corrector (42), the estimated value such that an estimation result of the thickness of the deposits becomes equal to or less than a threshold value defined in advance.

Furthermore, the estimation method according to an aspect of the present invention further includes: correcting, by the corrector (42), at least one of the estimated value of a thermal conductivity of the deposits, the estimated value of a temperature of the fluid inside the pipe (200), the estimated value of a temperature of the fluid outside the pipe (200), the estimated value of a heat transfer coefficient inside the pipe (200), or the estimated value of a heat transfer coefficient outside the pipe (200).

Furthermore, the estimation method according to an aspect of the present invention further includes: acquiring, by the acquirer (40), at least one of a measured value of a heat flux on an outer surface of the pipe (200) or a measured value of an internal temperature of a heat insulating material that covers the outer surface of the pipe (200); and estimating, by the estimator (43), the thickness of the deposits based on at least one of the measured value of the heat flux on the outer surface of the pipe (200) or the measured value of the internal temperature of the heat insulating material, the measured value of the outer surface temperature of the pipe (200), and the corrected estimated value.

Furthermore, the estimation method according to an aspect of the present invention further includes: inferring, by the inferrer (3), the execution time for the removal process for the deposits in accordance with a time when the removal process for the deposits has been detected or predicted; and correcting, by the corrector (42), the estimated value by using the measured value of the outer surface temperature of the pipe (200), which is acquired within the predetermined time from the inference result of the execution time for the removal process for the deposits.

Furthermore, the estimation method according to an aspect of the present invention further includes: performing the removal process for the deposits by an instrument that moves in the pipe (200).

Furthermore, the estimation method according to an aspect of the present invention further includes: detecting, by the inferrer (3), a vibration or a magnetic field generated by the instrument moving in the pipe (200) to infer the execution time for the removal process for the deposits.

Furthermore, the estimation method according to an aspect of the present invention further includes: performing the removal process for the deposits by introducing an inhibitor for inhibiting a formation of the deposits into the pipe (200).

Furthermore, the estimation method according to an aspect of the present invention further includes: acquiring, by the acquirer (40), the measured value from a sensor configured to measure the outer surface temperature of the pipe (200).

According to the present invention, it is possible to keep an estimation error for the thickness of deposits on an inner surface of a pipe within a predetermined range.

As used herein, the following directional terms "front, back, above, downward, right, left, vertical, horizontal, below, transverse, row and column" as well as any other similar directional terms refer to those instructions of a device equipped with the present invention. Accordingly, these terms, as utilized to describe the present invention should be interpreted relative to a device equipped with the present invention.

The term "configured" is used to describe a component, unit or part of a device includes hardware and/or software that is constructed and/or programmed to carry out the desired function.

Moreover, terms that are expressed as "means-plus-function" in the claims should include any structure that can be utilized to carry out the function of that part of the present invention.

The term "unit" is used to describe a component, unit or part of a hardware and/or software that is constructed and/or programmed to carry out the desired function. Typical examples of the hardware may include, but are not limited to, a device and a circuit.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. An estimation system comprising:
an acquirer configured to acquire a measured value of an outer surface temperature of a pipe through which fluid flows;
an inferrer configured to infer an execution time for a removal process for deposits on an inner surface of the pipe;
a corrector configured to correct an estimated value used for estimating a thickness of the deposits, by using the measured value of the outer surface temperature of the pipe, which is acquired within a predetermined time from an inference result of the execution time for the removal process for the deposits; and
an estimator configured to estimate the thickness of the deposits based on the corrected estimated value and the measured value of the outer surface temperature of the pipe.

2. The estimation system according to claim 1, wherein the corrector is configured to correct the estimated value such that an estimation result of the thickness of the deposits becomes equal to or less than a threshold value defined in advance.

3. The estimation system according to claim 1, wherein the corrector is configured to correct at least one of the estimated value of a thermal conductivity of the deposits, the estimated value of a temperature of the fluid inside the pipe, the estimated value of a temperature of the fluid outside the pipe, the estimated value of a heat transfer coefficient inside the pipe, or the estimated value of a heat transfer coefficient outside the pipe.

4. The estimation system according to claim 1, wherein the acquirer is configured to further acquire at least one of a measured value of a heat flux on an outer surface of the pipe or a measured value of an internal temperature of a heat insulating material that covers the outer surface of the pipe, and
wherein the estimator is configured to estimate the thickness of the deposits based on at least one of the measured value of the heat flux on the outer surface of the pipe or the measured value of the internal temperature of the heat insulating material, the measured value of the outer surface temperature of the pipe, and the corrected estimated value.

5. The estimation system according to claim 1, wherein the inferrer is configured to infer the execution time for the removal process for the deposits in accordance with a time when the removal process for the deposits has been detected or predicted, and
wherein the corrector is configured to correct the estimated value by using the measured value of the outer surface temperature of the pipe, which is acquired within the predetermined time from the inference result of the execution time for the removal process for the deposits.

6. The estimation system according to claim 1, wherein the removal process for the deposits is performed by an instrument that moves in the pipe.

7. The estimation system according to claim 6, wherein the inferrer is configured to detect a vibration or a magnetic field generated by the instrument moving in the pipe to infer the execution time for the removal process for the deposits.

8. The estimation system according to claim 1, wherein the removal process for the deposits is performed by introducing an inhibitor for inhibiting a formation of the deposits into the pipe.

9. The estimation system according to claim 1, further comprising a sensor configured to measure the outer surface temperature of the pipe,
wherein the acquirer is configured to acquire the measured value from the sensor.

10. The estimation system according to claim 1, further comprising a hardware-processor configured to execute a program stored in a memory to implement the acquirer, the inferrer, the corrector, and the estimator.

11. An estimation device comprising:
a corrector configured to correct an estimated value used for estimating a thickness of deposits on an inner surface of the pipe through which fluid flows, by using a measured value of an outer surface temperature of the pipe, which is acquired within a predetermined time from an inference result of an execution time for a removal process for the deposits; and
an estimator configured to estimate the thickness of the deposits based on the corrected estimated value and the measured value of the outer surface temperature of the pipe.

12. An estimation method performed by an estimation method, comprising:
acquiring, by an acquirer, a measured value of an outer surface temperature of a pipe through which fluid flows;
inferring, by an inferrer, an execution time for a removal process for deposits on an inner surface of the pipe;
correcting, by a corrector, an estimated value used for estimating a thickness of the deposits, by using the measured value of the outer surface temperature of the pipe, which is acquired within a predetermined time from an inference result of the execution time for the removal process for the deposits; and
estimating, by an estimator, the thickness of the deposits based on the corrected estimated value and the measured value of the outer surface temperature of the pipe.

13. The estimation method according to claim 12, further comprising:
correcting, by the corrector, the estimated value such that an estimation result of the thickness of the deposits becomes equal to or less than a threshold value defined in advance.

14. The estimation method according to claim 12, further comprising:
correcting, by the corrector, at least one of the estimated value of a thermal conductivity of the deposits, the estimated value of a temperature of the fluid inside the pipe, the estimated value of a temperature of the fluid outside the pipe, the estimated value of a heat transfer coefficient inside the pipe, or the estimated value of a heat transfer coefficient outside the pipe.

15. The estimation method according to claim 12, further comprising:

acquiring, by the acquirer, at least one of a measured value of a heat flux on an outer surface of the pipe or a measured value of an internal temperature of a heat insulating material that covers the outer surface of the pipe; and estimating, by the estimator, the thickness of the deposits based on at least one of the measured value of the heat flux on the outer surface of the pipe or the measured value of the internal temperature of the heat insulating material, the measured value of the outer surface temperature of the pipe, and the corrected estimated value.

16. The estimation method according to claim 12, further comprising:

inferring, by the inferrer, the execution time for the removal process for the deposits in accordance with a time when the removal process for the deposits has been detected or predicted; and correcting, by the corrector, the estimated value by using the measured value of the outer surface temperature of the pipe, which is acquired within the predetermined time from the inference result of the execution time for the removal process for the deposits.

17. The estimation method according to claim 12, further comprising:

performing the removal process for the deposits by an instrument that moves in the pipe.

18. The estimation method according to claim 17, further comprising:

detecting, by the inferrer, a vibration or a magnetic field generated by the instrument moving in the pipe to infer the execution time for the removal process for the deposits.

19. The estimation method according to claim 12, further comprising:

performing the removal process for the deposits by introducing an inhibitor for inhibiting a formation of the deposits into the pipe.

20. The estimation method according to claim 12, further comprising:

acquiring, by the acquirer, the measured value from a sensor configured to measure the outer surface temperature of the pipe.

\* \* \* \* \*